United States Patent

Major et al.

[11] Patent Number: 6,148,854
[45] Date of Patent: Nov. 21, 2000

[54] SYSTEM FOR LEAK DETECTION FROM UNDERGROUND AND ABOVEGROUND FUEL STORAGE TANKS

[75] Inventors: William Robert Major, Santa Barbara; Leslie Ann Karr; George Edward Warren, both of Oak View; John Anthony Norbutas, Camarillo; Frank Dellalibera, Camarillo; Kit Leroy Mack, Camarillo, all of Calif.

[73] Assignee: The United States of America as represented by the Secretary of the Navy, Washington, D.C.

[21] Appl. No.: 09/368,943

[22] Filed: Aug. 5, 1999

[51] Int. Cl.[7] ...................................................... G01M 3/26
[52] U.S. Cl. .............................. 137/557; 137/312; 73/40; 73/49.2
[58] Field of Search ..................................... 137/557, 312; 73/40.5 R, 49.2, 49.3, 49.1, 40

[56] References Cited

U.S. PATENT DOCUMENTS

| | | | |
|---|---|---|---|
| 4,223,692 | 9/1980 | Perry | 137/557 X |
| 4,796,469 | 1/1989 | Brown et al. | 73/49.2 |
| 5,367,797 | 11/1994 | Zaim | 73/49.2 |
| 5,445,010 | 8/1995 | Peacock | 73/49.2 |
| 5,787,916 | 8/1998 | Shaw | 137/557 X |
| 5,795,995 | 8/1998 | Shimaoka et al. | 73/40 |

*Primary Examiner*—Kevin Lee
*Attorney, Agent, or Firm*—David Kalmbaugh

[57] ABSTRACT

A leak detection system for detecting a fuel leak from a storage tank comprising a vertically positioned reference tube that spans the full useful length of the fuel tank which is generally located underground. The reference tube is filled and drained with the tank. The system also has a normally open pneumatic by-pass valve which when closed isolates the reference tube from the tank. A differential pressure gauge between the tank and reference tube reads zero pressure immediately after closure of the by-pass valve. A differential pressure reading between the tank and reference tube indicates the presence of fuel leakage from the tank. The inside of the reference tube is tapered at the top portion and bottom portion of the tube to match the cross sectional area of the tank upper dome and lower tank dome ends, while the outside diameter of the tube remains constant through out the length of the tube. A plurality of six inch pipe inserts having different inside diameters are slid into the reference tube at the top portion thereof tapering the top portion of the reference tube. Similarly, a plurality of six inch pipe inserts also having different inside diameters are slide into the reference tube at the bottom portion thereof tapering the top portion of the reference tube.

20 Claims, 3 Drawing Sheets

SYSTEM FOR LEAK DETECTION FROM UNDERGROUND AND ABOVEGROUND FUEL STORAGE TANKS

BACKGROUND OF THE INVENTION

1. Field of the Invention

The present invention relates generally to systems for leak detection in storage tanks. More specifically, the present invention relates to a differential pressure measurement system which detects fuel leaks from underground and aboveground storage tanks.

2. Description of the Prior Art

Currently, there are a large number of underground as well as above aboveground fuel storage tanks which potentially pose a significant environmental threat to groundwater and land resources worldwide. Leaking fuel storage tanks, left undetected, can contaminate large volumes of soil and ground water and require substantial resources and financial expenditures to clean up. Early detection of a fuel leak is necessary to minimize the environmental impact to soil and groundwater resulting from leaking fuel.

There are numerous types of fuel leak detection systems currently available to detect fuel leakage from an underground or aboveground storage tank. Volume based fuel leak detection systems measure the fuel level and fuel temperature in the tank. Temperature measurements are needed to compensate for fuel volume changes caused by temperature changes within the tank. A loss in temperature compensated fuel volume is an indication of a fuel leak.

Mass based leak detection systems measure the mass of fuel in the tank by measuring pressure near the bottom of the tank. Mass based detection systems are not affected by changes in the temperature since changes in temperature do not affect the total mass of fuel within the tank. Thus, the inaccuracies and cost associated with temperature measurements are avoided.

However, pressure measurement leak detection systems have limitations. For large bulk storage tanks, even with highly accurate pressure gauges, significant errors in detecting fuel leaks will occur. For example, a 250 feet deep by 100 feet diameter fuel tank generates a pressure of approximately 80 psi at the tank bottom. A high precision pressure transducer, which can detect a 0.01 psi change over full scale (precision=0.0125%), will have an approximate 2,200 gallon error for this size tank.

In addition, tank mechanical configurations, atmospheric conditions and ventilating systems can create differences in vapor pressures in upper tank above the fuel and lower tank areas. In large fuel storage tanks, these variations can cause several thousand gallon errors in leak detection systems.

Accordingly, there is a need for a highly accurate and reliable, yet relatively simplistic fuel leak detection system for use in large fuel storage tanks which overcomes the above-identified limitations of currently available pressure measurement fuel leak detection systems.

SUMMARY OF THE INVENTION

The present invention overcomes the disadvantages of the prior art, including those mentioned above, in that it comprises a relatively simple in design, yet highly effective fuel leak detection system for use with underground and above ground fuel storage tanks.

The fuel leak detection system includes a vertically positioned reference tube that spans the full useful length of the fuel tank which is generally located underground. The reference tube is filled and drained with the tank. The system also has a normally open pneumatic by-pass valve which when closed isolates the reference tube from the tank. A differential pressure gauge between the tank and reference tube reads zero pressure immediately after closure of the by-pass valve. A differential pressure reading between the tank and reference tube indicates the presence of fuel leak from the tank.

The inside of the reference tube is tapered at the top portion and bottom portion of the tube to match the cross-sectional area of the tank upper dome and lower tank dome ends, while the outside diameter of the tube remains constant through out the length of the tube. A plurality of six inch pipe inserts having different inside diameters are slid into the reference tube at the top portion thereof tapering the top portion of the reference tube. Similarly, a plurality of six inch pipe inserts also having different inside diameters are slid into the reference tube at the bottom portion thereof tapering the top portion of the reference tube.

DETAILED DESCRIPTION OF THE PREFERRED EMBODIMENT

Figure 1:
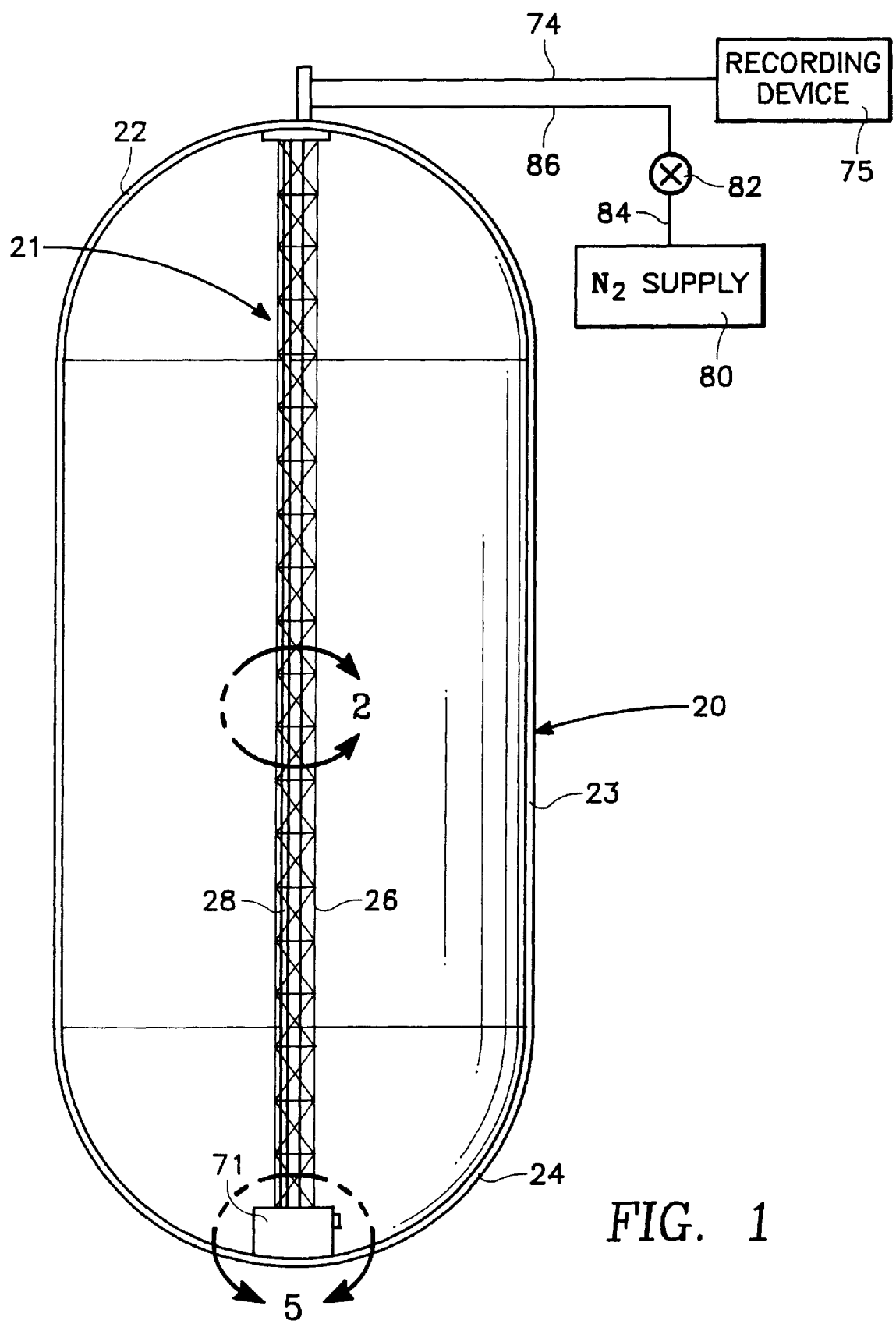
FIG. 1 is an elevation view illustrating a typical underground fuel storage tank which uses the system for fuel leak detection comprising the present invention.

Referring to FIG. 1 there is shown a typical underground fuel storage tank 20 which has a storage capacity of about 300,000 barrels of fuel. Tank 20 is buried underground with its top being located in a range from 100 feet to 175 feet below the surface, while the bottom of tank 20 is above sea level.

Tank 20 is generally a vertical right circular cylinder with an upper dome end 22, a center cylindrical section 23 and a lower domed end 24. The internal diameter of tank 20 is 100 feet and the overall height is 250 feet. Dome end 22 and 24 are nearly hemispherical with upper dome end 22 comprising six frustums of cone section and the lower dome end 24 comprising four frustums of cone section.

Figure 3:
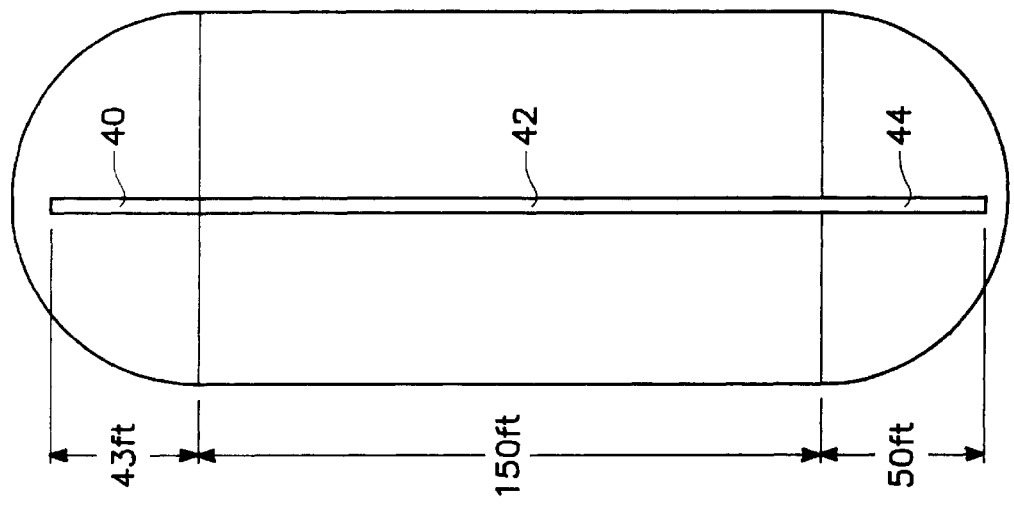
FIG. 3 is an elevation view illustrating the length of the upper, lower and middle sections of the reference tube of FIG. 1.
Figure 2:
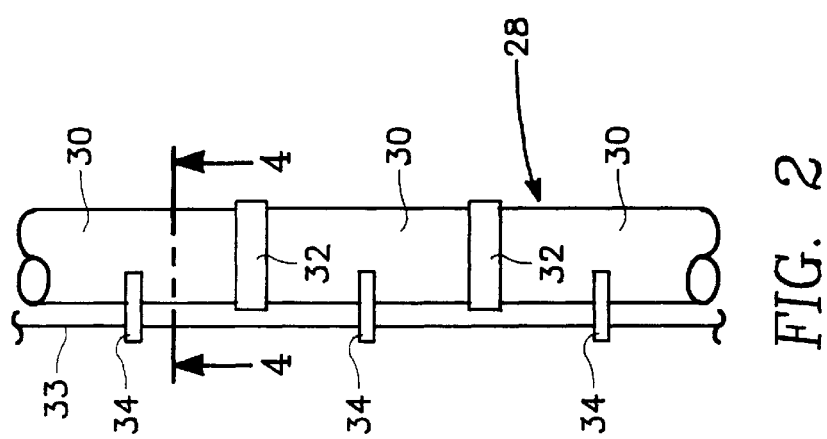
FIG. 2 is a view taken along line 2—2 of FIG. 1 illustrating a section of the reference tube of the system for fuel leak detection which comprises the present invention.

Referring to FIGS. 1, 2, and 3, located in the center of tank 20 is an open frame elevator tower 26. A vertically positioned reference tube 28 which is positioned within open frame elevator tower 26, spans the length of tank 20. Reference tube 28 comprises five foot sections of pipe 30 which are joined together by couplings 32. Couplings 32 may be any conventional and commercially available pipe couplings which are used to connect adjacent sections of pipe. The overall length of reference tube 28 is approximately 243 feet with the upper section 40 of reference tube 28 having an overall length of approximately 43 feet, the middle section 42 of reference tube 28 having an overall length of approximately 200 feet and the lower section 44 of reference tube 28 having an overall length of approximately 50 feet. Reference tube 28 is fabricated from stainless steel.

It should be noted that the upper section 40 of reference tube 28 is located within upper dome end 22 of tank 20, the middle section 42 of reference tube 28 is located within center cylindrical section 23 of tank 20 and the lower section 44 of reference tube 28 is located within lower domed end 24 of tank 20.

Figure 4:
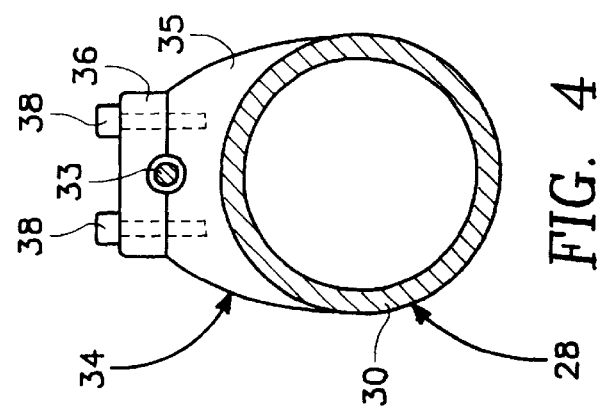
FIG. 4 is a view taken along line 4—4 of FIG. 2 illustrating the mechanism for clamping an anti-buckle to the reference tube of FIG. 1.

Referring to FIGS. 2 and 4, system for fuel leak detection 21 includes a guide wire 33 which operates as an anti-buckle device to provide support for reference tube 28 preventing reference tube 28 from buckling. A plurality of wire clamps 34 are used to clamp the guide wire 33 to reference tube 28. Each wire clamp 34 includes a base 35 and a clamping bar 36 which secures wire clamp 34 to base 35 of wire clamp 34. A pair of bolts 38 are used to connect and then secure clamping bar 36 and base 35.

Referring to FIGS. 1, 3, 5, 6A and 6B, reference tube 28 maintains a constant outside diameter of 1.25 inches throughout its entire length. The inside diameter of reference tube 28 remains constant throughout section 42, and narrows in upper section 40 and lower section 44. The inside diameter of reference tube 28 throughout section 42 is one inch.

Figure 5:
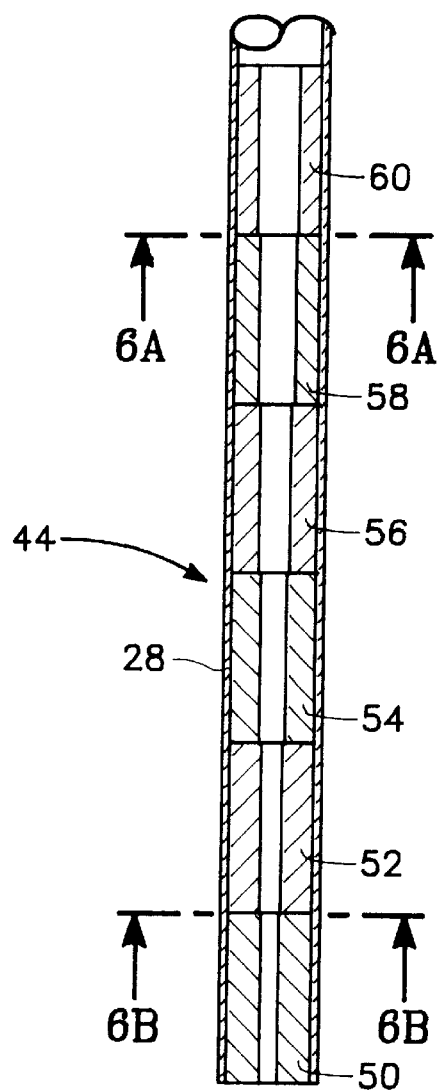
FIG. 5 is an elevation view illustrating the lower section of the reference tube of FIG. 1.

As shown in FIG. 5, lower section 44 of reference tube 28 includes a plurality of pipe inserts 50, 52, 54, 56, 58 and 60 with each pipe insert 50, 52, 54, 56, 58 and 60 having an inside diameter which is smaller than the inside diameter of the pipe insert positioned above it within section 44 of reference tube 28. For example, the inside diameter $d_2$ of pipe insert 52 (FIG. 6B) is smaller than the inside diameter $d_1$ of pipe insert 60 (FIG. 6A) which is located above pipe insert 52 within section 44 of reference tube 28. Each pipe insert 50, 52, 54, 56, 58 and 60 of section 44 is six inches in length and slides into its location within section 44 of reference tube 28.

It should be noted that the pipe insert's 50, 52, 54, 56, 58 and 60 cross sectional area changes in direct proportion to the tank wall's cross sectional area in the upper dome end 22 of tank 20 and the lower doom end 24 of tank 20.

Figure 7:
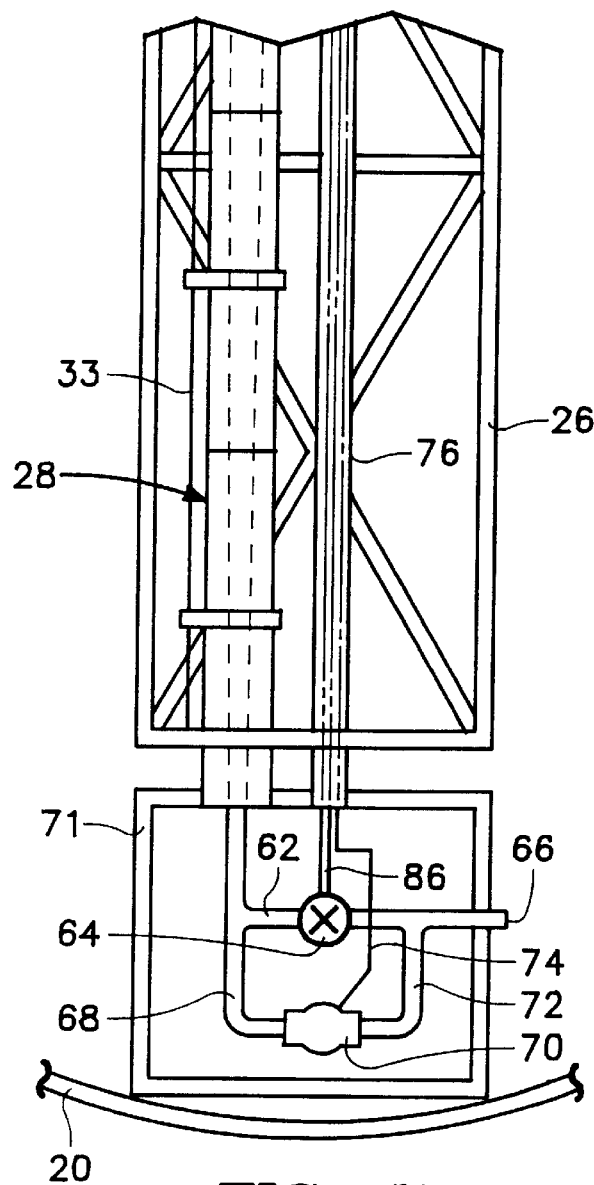
FIG. 7 is a partial elevation view of the lower domed end of the tank of FIG. 1.
Figure 6A:
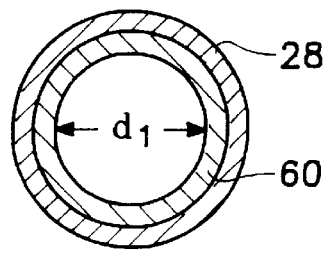
FIGS. 6A and 6B are cross sectional views of the lower section of the reference tube taken along lines 6A—6A and 6B—6B of FIG. 5.
Figure 6B:
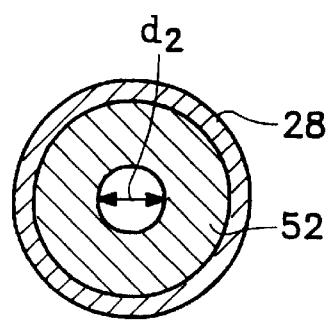

Referring to FIGS. 1 and 7, the lower end of reference tube 28 is connected via a fluid passageway 62 to the first inlet/outlet port of a normally open pneumatic by-pass valve 64 while the second inlet/outlet port of by-pass valve 64 is connected via a fluid passageway 66 to the interior of tank 20. Reference tube 28 is also connected via a fluid passageway 68 to the first inlet/outlet port of a differential pressure cell/gauge 70. The second inlet/outlet port of differential pressure cell/gauge 70 is connected via fluid passageways 66 and 72 to the interior of tank 20. As shown in FIG. 7, pneumatic by-pass valve 64 and differential pressure cell/gauge 70 are mounted within an enclosure 71 located below tank 20.

An electrical cable 74 connects differential pressure cell/gauge 70 to a measurement and recording device 75. Differential pressure measurements from differential pressure cell/gauge 70 are recorded by measurement and recording device 75. Electrical cable 74 is enclosed within a stainless steel tube container 76 which runs the length of tank 20. A compressed nitrogen supply 80 is connected to the inlet port of an automated actuator valve 82 via a fluid passageway 84, while the outlet port of automated actuator valve 82 is connected to pneumatic by-pass valve 64 via a fluid passageway 86.

Referring to FIGS. 1–7, in operation, reference tube 28 is filled and drained with tank 20. After a settling period, which is brief (e.g. one to twenty four) pneumatic by-pass valve 64 is closed. Activating actuator valve 82 allows compressed nitrogen to be supplied to pneumatic by-pass valve 64 closing valve 64. Reference tube 28 is now isolated from the interior of tank 20.

When static conditions are reached the pressure on the tank side of differential pressure cell/gauge 70 and on the servo side of differential pressure cell/gauge 70 are equal. A pressure differential between reference tube 28 and the interior of tank 20 measured by differential pressure cell/gauge 70 indicates the presence of a fuel leak from tank 20. Differential pressure cell/gauge 70 then supplies electrical signals to measurement and recording device 76 indicating the pressure is lower on the tank side of differential pressure cell/gauge 70 than on the reference tube side of differential pressure cell/gauge 70.

At this time it should be noted that a conventional low range differential pressure system for fuel leak detection requires a 0 to 586-kPa full range pressure transducer to measure fuel leaks from a storage tank. The fuel leak detection system of the present invention, however, requires less than a 0 to 6.9-kPa full range pressure transducer to detect a fuel leak, and therefore provides a 100 times improvement in transducer precision and thus leak detection accuracy. Further, except for normally open pneumatic by-pass valve 64, fuel leak detection system 21 has no moving parts which results in a highly reliable and accurate fuel leak detection system.

From the foregoing, it may readily be seen that the present invention comprises a new, unique and exceedingly useful system for fuel leak detection from underground and aboveground storage tanks which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A fuel storage tank having a leak detection system comprising:

a reference tube centrally located and vertically positioned within said fuel storage tank, said reference tube spanning the length of said fuel storage tank;

said fuel storage tank having an upper dome end and a lower dome end, said upper dome end and said lower dome end each having a cross-sectional area variation;

said reference tube having an upper portion thereof positioned within the upper dome end of said fuel storage tank, the upper portion of said reference tube having an inside cross-sectional area which varies in direct proportion to the cross-sectional area variation of the upper dome end of said fuel storage tank;

said reference tube having a lower portion thereof positioned within the lower dome end of said fuel storage tank, the lower portion of said reference tube having an inside cross-sectional area which varies in direct proportion to the cross-sectional area variation of the lower dome end of said fuel storage tank;

a pneumatic by-pass valve having first and second inlet/outlet ports, the first inlet/outlet port of said pneumatic by-pass valve being connected to said fuel storage tank and the second inlet/outlet port of said pneumatic by-pass valve being connected to the lower portion of said reference tube;

said pneumatic by-pass valve being openable and closable for admitting liquid from said fuel storage tank into said reference tube and for closing said reference tube to said liquid in said fuel storage tank;

said pneumatic by-pass valve being initially open allowing said liquid from said fuel storage tank to enter said reference tube until said liquid in said reference tube and said liquid in said fuel storage tank are at identical liquid levels;

a differential pressure gauge communicating with said reference tube and said fuel storage tank, said differential pressure gauge measuring pressure differential between said reference tube and said fuel storage tank which occurs when liquid levels in said reference tube and fuel storage tank are not identical;

a recording device connected to said differential pressure gauge for recording said differential pressure measured by said differential pressure gauge; and means for closing said pneumatic by-pass valve when said liquid levels in said reference tube and fuel storage tank are identical.

2. The fuel storage tank of claim 1 wherein said reference tube is fabricated from stainless steel.

3. The fuel storage tank of claim 1 wherein said means for closing said pneumatic by-pass valve comprises:

a source of compressed nitrogen; and an automated actuator valve having an inlet port connected to said source of compressed nitrogen, and an outlet port connected to said pneumatic by-pass valve.

4. The fuel storage tank of claim 1 further comprising an enclosure located within the lower dome end of said fuel storage tank, said enclosure having said pneumatic by-pass valve and said differential pressure gauge mounted therein.

5. The fuel storage tank of claim 1 further comprising an open frame elevator tower centrally located within said fuel storage tank and spanning the length of said fuel storage tank, said reference tube being positioned within said open frame elevator tower.

6. The fuel storage tank of claim 1 further comprising a guide wire coupled to said reference tube, said guide wire operating as an anti-buckle device to provide support for said reference tube preventing said reference tube from buckling.

7. The fuel storage tank of claim 1 further comprising a plurality of pipe inserts positioned within the upper portion of said reference tube, each of said plurality of pipe inserts having a different inside diameter to form the inside cross-sectional area of the upper portion of said reference tube which varies in direct proportion to the cross-sectional area variation of the upper dome end of said fuel storage tank.

8. The fuel storage tank of claim 7 wherein each of said plurality of pipe inserts comprises a six inch pipe insert.

9. The fuel storage tank of claim 1 further comprising a plurality of pipe inserts positioned within the lower portion of said reference tube, each of said plurality of pipe inserts having a different inside diameter to form the inside cross-sectional area of the lower portion of said reference tube which varies in direct proportion to the cross-sectional area variation of the lower dome end of said fuel storage tank.

10. The fuel storage tank of claim 9 wherein each of said plurality of pipe inserts comprises a six inch pipe insert.

11. The fuel storage tank of claim 1 wherein said differential pressure gauge comprises a 0 to 6.9-kPa full range pressure transducer.

12. A fuel storage tank having a leak detection system comprising:

a reference tube centrally located and vertically positioned within said fuel storage tank, said reference tube spanning the length of said fuel storage tank;

said fuel storage tank having an upper dome end and a lower dome end, said upper dome end and said lower dome end each having a cross-sectional area variation;

said reference tube having an upper portion thereof positioned within the upper dome end of said fuel storage tank, the upper portion of said reference tube having an inside cross-sectional area which varies in direct proportion to the cross-sectional area variation of the upper dome end of said fuel storage tank;

said reference tube having a lower portion thereof positioned within the lower dome end of said fuel storage tank, the lower portion of said reference tube having an inside cross-sectional area which varies in direct proportion to the cross-sectional area variation of the lower dome end of said fuel storage tank;

a pneumatic by-pass valve having first and second inlet/outlet ports, the first inlet/outlet port of said pneumatic by-pass valve being connected to said fuel storage tank and the second inlet/outlet port of said pneumatic by-pass valve being connected to the lower portion of said reference tube;

said pneumatic by-pass valve being openable and closable for admitting liquid from said fuel storage tank into said reference tube and for closing said reference tube to said liquid in said fuel storage tank;

said pneumatic by-pass valve being initially open allowing said liquid from said fuel storage tank to enter said reference tube until said liquid in said reference tube and said liquid in said fuel storage tank are at identical liquid levels;

a differential pressure gauge communicating with said reference tube and said fuel storage tank, said differential pressure gauge measuring pressure differential between said reference tube and said fuel storage tank which occurs when liquid levels in said reference tube and fuel storage tank are not identical;

a recording device connected to said differential pressure gauge for recording said differential pressure measured by said differential pressure gauge;

a source having compressed nitrogen;

an automated actuator valve having an inlet port connected to said source having said compressed nitrogen, and an outlet port connected to said pneumatic by-pass valve;

said automated actuator valve when activated allowing said compressed nitrogen to pass therethrough to said pneumatic by-pass valve closing said pneumatic by-pass valve; and a guide wire coupled to said reference tube, said guide wire operating as an anti-buckle device to provide support for said reference tube preventing said reference tube from buckling.

13. The fuel storage tank of claim 12 wherein said reference tube is fabricated from stainless steel.

14. The fuel storage tank of claim 12 further comprising an enclosure located within the lower dome end of said fuel storage tank, said enclosure having said pneumatic by-pass valve and said differential pressure gauge mounted therein.

15. The fuel storage tank of claim 12 further comprising a plurality of pipe inserts positioned within the upper portion of said reference tube, each of said plurality of pipe inserts having a different inside cross-sectional area of the upper portion of said reference tube which varies in direct proportion to the cross-sectional area variation of the upper dome end of said fuel storage tank.

16. The fuel storage tank of claim 15 wherein each of said plurality of pipe inserts comprises a six inch pipe insert.

17. The fuel storage tank of claim 12 further comprising a plurality of pipe inserts positioned within the lower portion of said reference tube, each of said plurality of pipe inserts having a different inside diameter to form the inside cross-sectional area of the lower portion of said reference tube which varies in direct proportion to the cross-sectional area variation of the lower dome end of said fuel storage tank.

18. The fuel storage tank of claim 17 wherein each of said plurality of pipe inserts comprises a six inch pipe insert.

19. A fuel storage tank having a leak detection system comprising:

a reference tube centrally located and vertically positioned within said fuel storage tank, said reference tube spanning the length of said fuel storage tank;

said fuel storage tank having an upper dome end and a lower dome end, said upper dome end and said lower dome end each having a cross-sectional area variation;

said reference tube having an upper portion thereof positioned within the upper dome end of said fuel storage tank, the upper portion of said reference tube having an inside cross-sectional area which varies in direct proportion to the cross-sectional area variation of the upper dome end of said fuel storage tank;

a first plurality of pipe inserts positioned within the upper portion of said reference tube, each of said first plurality of pipe inserts having a different inside diameter to form the inside cross-sectional area of the upper portion of said reference tube which varies in direct proportion to the cross-sectional area variation of the upper dome end of said fuel storage tank;

said reference tube having a lower portion thereof positioned within the lower dome end of said fuel storage tank, the lower portion of said reference tube having an inside cross-sectional area which varies in direct proportion to the cross-sectional area variation of the lower dome end of said fuel storage tank;

a second plurality of pipe inserts positioned within the lower portion of said reference tube, each of said second plurality of pipe inserts having a different inside diameter to form the inside cross-sectional area of the lower portion of said reference tube which varies in direct proportion to the cross-sectional area variation of the lower dome end of said fuel storage tank;

a pneumatic by-pass valve having first and second inlet/outlet ports, the first inlet/outlet port of said pneumatic by-pass valve being connected to said fuel storage tank and the second inlet/outlet port of said pneumatic by-pass valve being connected to the lower portion of said reference tube;

said pneumatic by-pass valve being openable and closable for admitting liquid from said fuel storage tank into said reference tube and for closing said reference tube to said liquid in said fuel storage tank;

said pneumatic by-pass valve being initially open allowing said liquid from said fuel storage tank to enter said reference tube until said liquid in said reference tube and said liquid in said fuel storage tank are at identical liquid levels;

a differential pressure gauge communicating with said reference tube and said fuel storage tank, said differential pressure gauge measuring pressure differential between said reference tube and said fuel storage tank which occurs when liquid levels in said reference tube and fuel storage tank are not identical;

an enclosure located within the lower dome end of said fuel storage tank, said enclosure having said pneumatic by-pass valve and said differential pressure gauge mounted therein;

a recording device connected to said differential pressure gauge for recording said differential pressure measured by said differential pressure gauge;

a source having compressed nitrogen;

an automated actuator valve having an inlet port connected to said source having said compressed nitrogen, and an outlet port connected to said pneumatic by-pass valve;

said automated actuator valve when activated allowing said compressed nitrogen to pass therethrough to said pneumatic by-pass valve closing said pneumatic by-pass valve; and a guide wire coupled to said reference tube, said guide wire operating as an anti-buckle device to provide support for said reference tube preventing said reference tube from buckling.

20. The fuel storage tank of claim 19 wherein each of said first plurality of pipe inserts and each of said second plurality of pipe inserts comprises a six inch pipe insert.

* * * * *